US011952749B2

(12) United States Patent
Yamada et al.

(10) Patent No.: US 11,952,749 B2
(45) Date of Patent: Apr. 9, 2024

(54) WORK VEHICLE, AND CONTROL DEVICE AND CONTROL METHOD FOR POWER MACHINE

(71) Applicant: KOMATSU LTD., Tokyo (JP)

(72) Inventors: Kenichi Yamada, Tokyo (JP); Shogo Miyazaki, Tokyo (JP); Akira Takeno, Tokyo (JP); Shota Yamawaki, Tokyo (JP)

(73) Assignee: KOMATSU LTD., Tokyo (JP)

( * ) Notice: Subject to any disclaimer, the term of this patent is extended or adjusted under 35 U.S.C. 154(b) by 476 days.

(21) Appl. No.: 17/289,423

(22) PCT Filed: Nov. 7, 2019

(86) PCT No.: PCT/JP2019/043760
§ 371 (c)(1),
(2) Date: Apr. 28, 2021

(87) PCT Pub. No.: WO2020/105461
PCT Pub. Date: May 28, 2020

(65) Prior Publication Data
US 2021/0372089 A1 Dec. 2, 2021

(30) Foreign Application Priority Data

Nov. 19, 2018 (JP) ................. 2018-216736

(51) Int. Cl.
*E02F 9/22* (2006.01)
*E02F 9/20* (2006.01)
(Continued)

(52) U.S. Cl.
CPC .......... *E02F 9/2253* (2013.01); *E02F 9/2004* (2013.01); *E02F 9/2292* (2013.01);
(Continued)

(58) Field of Classification Search
CPC ..... E02F 9/2253; E02F 9/2004; E02F 9/2292; E02F 9/2296; F16H 61/4157
See application file for complete search history.

(56) References Cited

U.S. PATENT DOCUMENTS 6,050,091 A * 4/2000 Maruta ................. E02F 9/123
60/436
6,564,549 B2 * 5/2003 Nagura ............... F16H 61/4157
60/436
(Continued)

FOREIGN PATENT DOCUMENTS

CN 104870287 A 8/2015
CN 105658493 A 6/2016
(Continued)

OTHER PUBLICATIONS

The International Search Report for the corresponding international application No. PCT/JP2019/043760, dated Jan. 28, 2020.

*Primary Examiner* — Huan Le
(74) *Attorney, Agent, or Firm* — Global IP Counselors, LLP (57) ABSTRACT

A control device for a power machine includes a target circuit pressure specifying unit configured to specify a target circuit pressure of the hydrostatic continuously variable transmission, a measurement value acquisition unit configured to acquire an actual circuit pressure of the hydrostatic continuously variable transmission, a brake torque determination unit configured to determine a brake torque based on the target circuit pressure and the actual circuit pressure, and a pump control unit configured to control the hydraulic pump based on the brake torque. The brake torque is a torque consumed by the hydraulic pump.

6 Claims, 5 Drawing Sheets

(51) Int. Cl.
*F04D 13/02* (2006.01)
*F04D 15/00* (2006.01)
*F15B 15/18* (2006.01)
*F16H 61/4008* (2010.01)
*F16H 61/4157* (2010.01)
*F16H 61/472* (2010.01)

(52) U.S. Cl.
CPC .......... *E02F 9/2296* (2013.01); *F04D 13/028* (2013.01); *F04D 15/00* (2013.01); *F15B 15/18* (2013.01); *F16H 61/4008* (2013.01); *F16H 61/4157* (2013.01); *F16H 61/472* (2013.01)

(56) References Cited

U.S. PATENT DOCUMENTS

| | | | |
|---|---|---|---|
| 10,619,734 B2 * | 4/2020 | Witte | ................ F16H 61/4017 |
| 2011/0308878 A1 | 12/2011 | Shirao | |
| 2012/0310494 A1 | 12/2012 | Asami et al. | |
| 2013/0125536 A1 | 5/2013 | Ho et al. | |
| 2015/0345111 A1 | 12/2015 | Miyamoto et al. | |
| 2016/0017570 A1 | 1/2016 | Miyamoto et al. | |
| 2016/0251828 A1 | 9/2016 | Miyamoto et al. | |

FOREIGN PATENT DOCUMENTS

| | | |
|---|---|---|
| JP | 3-84472 U | 8/1991 |
| JP | 2011-189917 A | 9/2011 |
| JP | 2015-96401 A | 5/2015 |
| WO | 2010/116853 A1 | 10/2010 |
| WO | 2015/072264 A1 | 5/2015 |

* cited by examiner

WORK VEHICLE, AND CONTROL DEVICE AND CONTROL METHOD FOR POWER MACHINE

CROSS REFERENCE TO RELATED APPLICATION(S)

This application is a U.S. National stage application of International Application No. PCT/JP2019/043760, filed on Nov. 7, 2019. This U.S. National stage application claims priority under 35 U.S.C. § 119(a) to Japanese Patent Application No. 2018-216736, filed in Japan on Nov. 19, 2018, the entire contents of which are hereby incorporated herein by reference.

BACKGROUND

Field of the Invention

The present invention relates to a work vehicle, and a control device and a control method for a power machine.

Background Information

A work vehicle such as a wheel loader equipped with a continuously variable transmission is known. Examples of the continuously variable transmission include a hydraulic static transmission (HST) and a hydraulic mechanical transmission (HMT). Japanese Unexamined Patent Application, First Publication No. 2015-096401 discloses the following technique. When the work vehicle equipped with the continuously variable transmission is braked, a braking force is obtained by rotation of a hydraulic pump connected to a power take off (PTO). In this manner, an excessive rotation speed of an engine is prevented.

SUMMARY

According to the technique disclosed in Japanese Unexamined Patent Application, First Publication No. 2015-096401, a control device accurately controls a braking force in an electric motor. On the other hand, regenerative power is absorbed by driving the hydraulic pump connected to the engine to prevent overspeed when engine rotation increases due to regeneration to the engine. However, in order to properly brake the work vehicle by using the technique disclosed in Japanese Unexamined Patent Application, First Publication No. 2015-096401, it is necessary to provide electrical hardware such as an electric motor capable of properly controlling torques and an inverter for driving the electric motor. Therefore, when a power system includes a hydraulic component, it is difficult to accurately control braking of the work vehicle.

An object of the present invention is to provide a work vehicle, and a control device and a control method for a power machine, which are capable of accurately controlling a braking force regardless of the presence or absence of electrical hardware.

According to a first aspect of the present invention, there is provided a control device for a power machine including a drive source, a hydraulic pump driven by a driving force of the drive source, a power take off device that transmits a portion of the driving force of the drive source to the hydraulic pump, a power transmission device including a hydrostatic continuously variable transmission, in which an input shaft is connected to the power take off device, an output shaft is connected to a load, and the driving force input to the input shaft is transmitted to the output shaft, and an operation device that provides an instruction regarding a magnitude of the driving force of the drive source. The control device includes a target circuit pressure specifying unit configured to specify a target circuit pressure which is a target pressure of the hydrostatic continuously variable transmission, a measurement value acquisition unit configured to acquire an actual circuit pressure which is a measurement value of a pressure of the hydrostatic continuously variable transmission, a brake torque determination unit configured to determine a brake torque based on the target circuit pressure and the actual circuit pressure, the brake torque which is a torque consumed by the hydraulic pump, and a pump control unit configured to control the hydraulic pump based on the brake torque.

According to at least one of the above-described aspects, the control device can accurately control a braking force of a power device regardless of whether or not the power device includes electrical hardware.

DETAILED DESCRIPTION OF EMBODIMENT(S)

First Embodiment

Hereinafter, embodiments will be described in detail with reference to the drawings.

Figure 1:
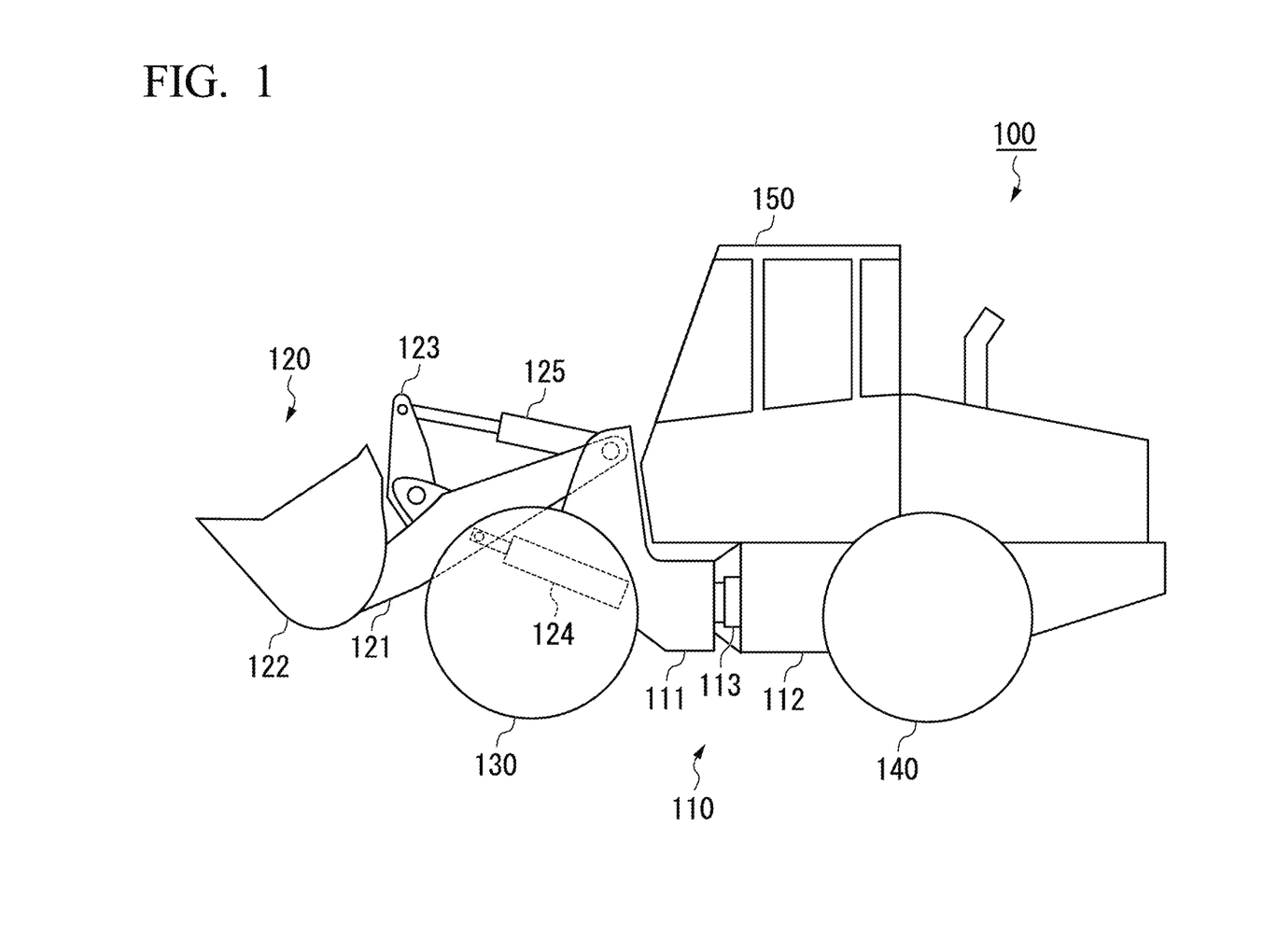
FIG. 1 is a side view of a work vehicle according to a first embodiment.

FIG. 1 is a side view of a work vehicle according to a first embodiment.

A work vehicle 100 according to the first embodiment is a wheel loader. The work vehicle 100 includes a vehicle body 110, a work machine 120, a front wheel part 130, a rear wheel part 140, and an operator cab 150. The work vehicle 100 is an example of a power machine.

The vehicle body 110 includes a front vehicle body 111, a rear vehicle body 112, and a steering cylinder 113. The front vehicle body 111 and the rear vehicle body 112 are attached to be pivotable around a steering shaft extending in an upward-downward direction of the vehicle body 110. The front wheel part 130 is provided in a lower part of the front vehicle body 111, and the rear wheel part 140 is provided in a lower part of the rear vehicle body 112.

The steering cylinder 113 is a hydraulic cylinder. A base end portion of the steering cylinder 113 is attached to the rear vehicle body 112, and a tip portion is attached to the front vehicle body 111. The steering cylinder 113 is expanded and contracted by hydraulic oil, thereby defining an angle between the front vehicle body 111 and the rear vehicle body 112. That is, a steering angle of the front wheel part 130 is defined by expansion and contraction of the steering cylinder 113.

The work machine 120 is used for excavating and transporting a work object such as earth and sand. The work machine 120 is provided in a front part of the vehicle body 110. The work machine 120 includes a boom 121, a bucket 122, a bell crank 123, a lift cylinder 124, and a bucket cylinder 125.

A base end portion of the boom 121 is attached to a front part of the front vehicle body 111 via a pin.

The bucket 122 includes a blade for excavating the work object and a container for carrying the excavated work object. A base end portion of the bucket 122 is attached to a tip portion of the boom 121 via a pin.

The bell crank 123 transmits power of the bucket cylinder 125 to the bucket 122. A first end of the bell crank 123 is attached to a bottom portion of the bucket 122 via a link mechanism. A second end of the bell crank 123 is attached to a tip portion of the bucket cylinder 125 via a pin.

The lift cylinder 124 is a hydraulic cylinder. A base end portion of the lift cylinder 124 is attached to a front part of the front vehicle body 111. A tip portion of the lift cylinder 124 is attached to the boom 121. As the lift cylinder 124 is expanded and contracted by hydraulic oil, the boom 121 is driven in an upward direction or a downward direction.

The bucket cylinder 125 is a hydraulic cylinder. A base end portion of the bucket cylinder 125 is attached to a front part of the front vehicle body 111. A tip portion of the bucket cylinder 125 is attached to the bucket 122 via the bell crank 123. As the bucket cylinder 125 is expanded and contracted by the hydraulic oil, the bucket 122 swings in a tilt direction or a dump direction.

The operator cab 150 is a space for an operator who rides in the space to operate the work vehicle 100. The operator cab 150 is provided in an upper part of the rear vehicle body 112.

Figure 2:
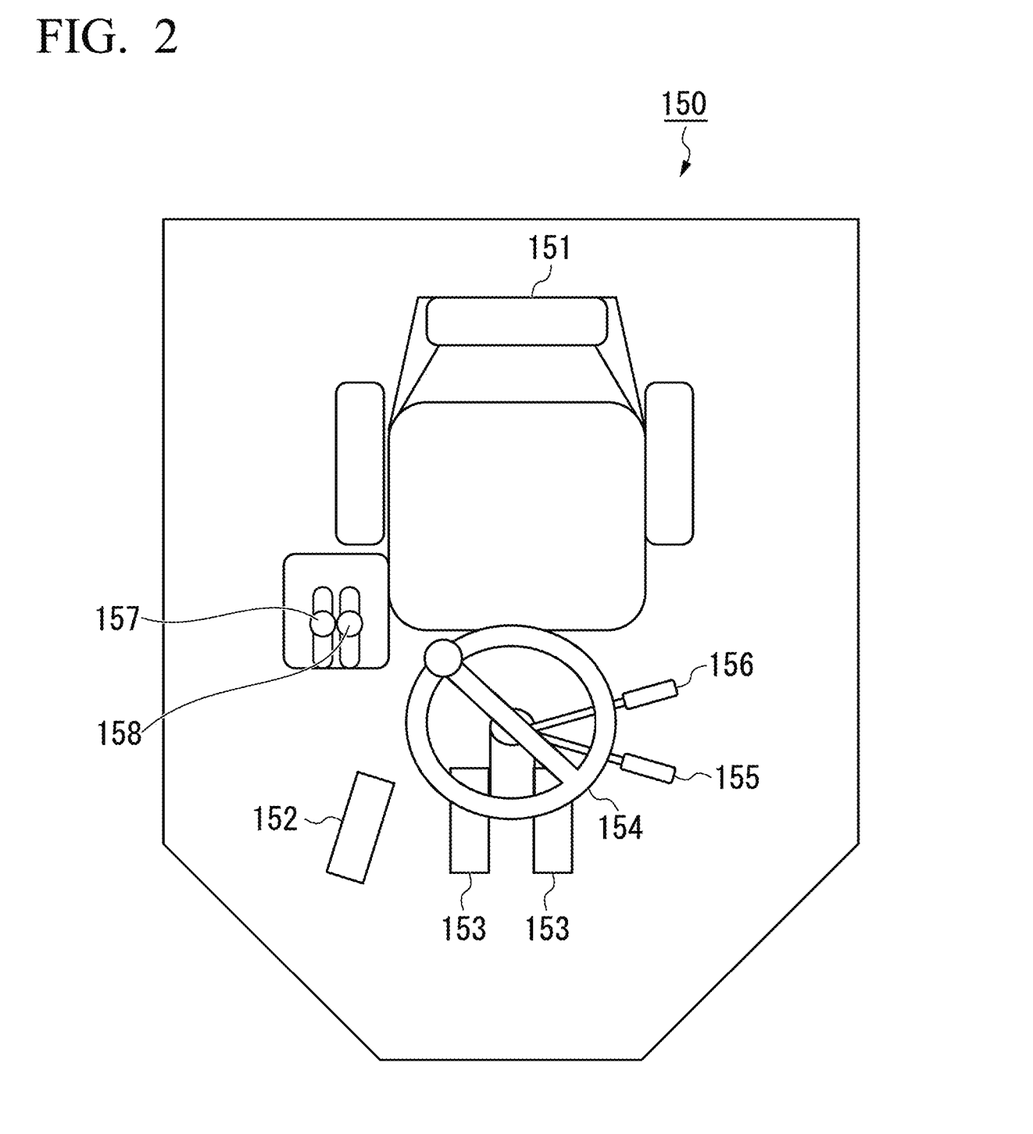
FIG. 2 is a diagram showing an internal configuration of an operator cab according to the first embodiment.

FIG. 2 is a diagram showing an internal configuration of the operator cab according to the first embodiment. The operator cab 150 is internally provided with a seat 151, an accelerator pedal 152, a brake pedal 153, a steering wheel 154, a front/rear selection switch 155, a shift switch 156, a boom lever 157, and a bucket lever 158.

The accelerator pedal 152 is operated to set a driving force (traction force) for traveling which is generated by the work vehicle 100. As an operation amount of the bucket lever 158 increases, a target driving force (target traction force) is set to be stronger.

The brake pedal 153 is operated to set a braking force for traveling which is generated by the work vehicle 100. As an operation amount of the brake pedal 153 increases, the braking force is set to be stronger.

The steering wheel 154 is operated to set a steering angle of the work vehicle 100.

The front/rear selection switch 155 is operated to set a traveling direction of the work vehicle 100. The traveling direction of the work vehicle is either forward (F), rearward (R), or neutral (N).

The shift switch 156 is operated to set a speed range of the power transmission device. For example, the shift switch 156 is operated to select one speed range from a first speed, a second speed, a third speed, and a fourth speed.

The boom lever 157 is operated to set a movement amount of a raising operation or a lowering operation of the boom 121. The boom lever 157 receives the lowering operation when tilted forward, and receives the raising operation when tilted rearward.

The bucket lever 158 is operated to set a movement amount of a dump operation or a tilt operation of the bucket 122. The bucket lever 158 receives the dump operation when tilted forward, and receives the tilt operation when tilted rearward.

(Power System)

Figure 3:
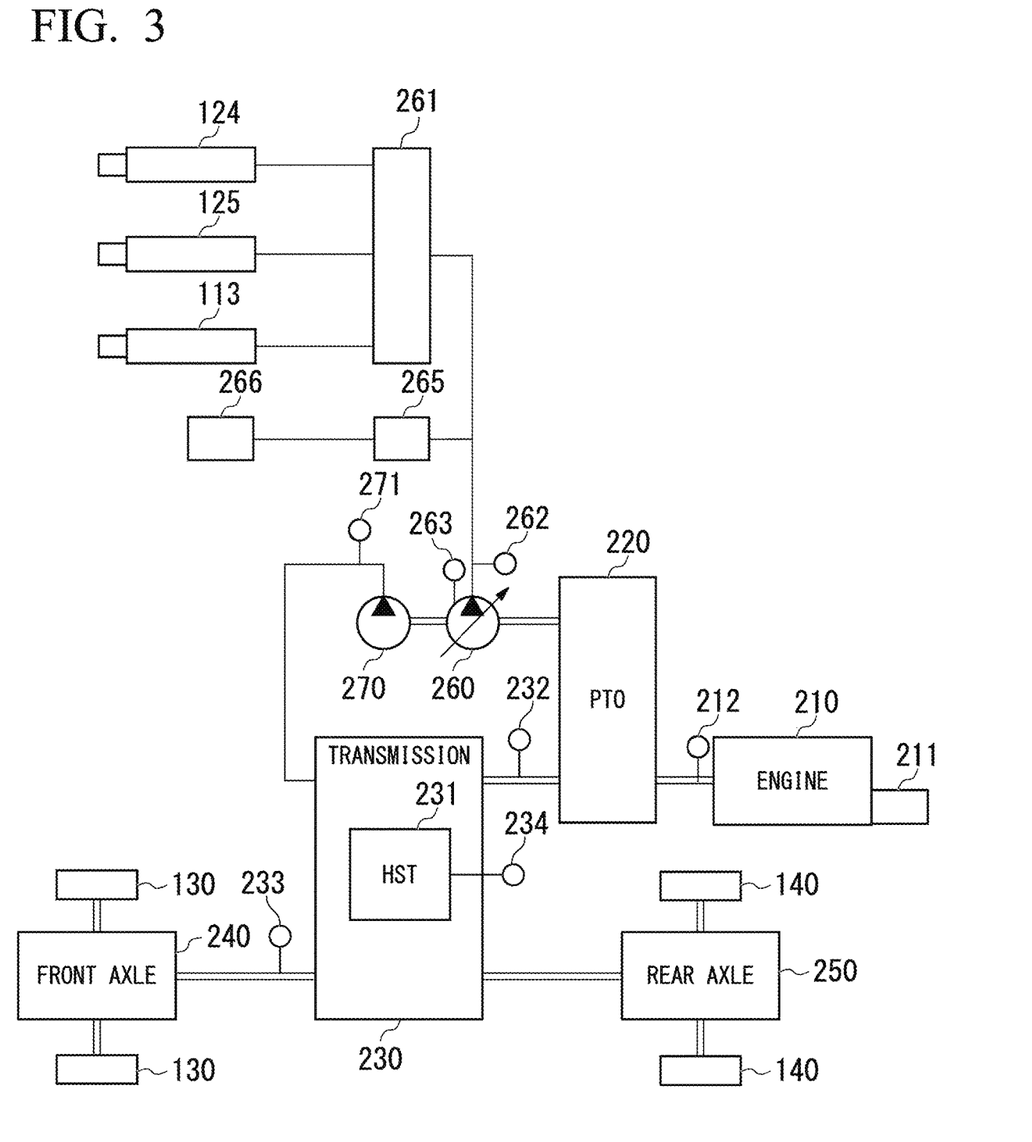
FIG. 3 is a schematic diagram showing a power system of the work vehicle according to the first embodiment.

FIG. 3 is a schematic diagram showing a power system of the work vehicle according to the first embodiment.

The work vehicle 100 includes an engine 210, a power take off 220 (PTO: power take off device), a transmission 230, a front axle 240, a rear axle 250, a variable capacity pump 260, and a fixed capacity pump 270.

For example, the engine 210 is a diesel engine. The engine 210 is provided with a fuel injection device 211 and an engine tachometer 212. The fuel injection device 211 controls a driving force of the engine 210 by adjusting the amount of fuel injected into a cylinder of the engine 210. The engine tachometer 212 measures a rotation speed of the engine 210.

The PTO 220 transmits a portion of the driving force of the engine 210 to the variable capacity pump 260 and the fixed capacity pump 270. That is, the PTO 220 distributes the driving force of the engine 210 to the transmission 230, the variable capacity pump 260, and the fixed capacity pump 270.

The transmission 230 is a continuously variable transmission including a hydrostatic continuously variable transmission (HST) 231. The transmission 230 may perform shift control by using only the HST 231, or may be a hydraulic mechanical continuously variable transmission (HMT) that performs shift control by using a combination of the HST 231 and a planetary gear mechanism. The transmission 230 shifts the driving force input to an input shaft, and outputs the driving force from an output shaft. The input shaft of the transmission 230 is connected to the PTO 220, and the output shaft is connected to the front axle 240 and the rear axle 250. That is, the transmission 230 transmits the driving force of the engine 210 which is distributed by the PTO 220 to the front axle 240 and the rear axle 250. The transmission 230 is provided with an input shaft tachometer 232 and an output shaft tachometer 233. The input shaft tachometer 232 measures a rotation speed of the input shaft of the transmission 230. The output shaft tachometer 233 measures a rotation speed of the output shaft of the transmission 230. The HST 231 of the transmission 230 is provided with an HST pressure gauge 234. The HST pressure gauge 234 measures a pressure of the HST 231.

The front axle 240 transmits the driving force output by the transmission 230 to the front wheel part 130. In this manner, the front wheel part 130 is rotated.

The rear axle 250 transmits the driving force output by the transmission 230 to the rear wheel part 140. In this manner, the rear wheel part 140 is rotated.

The front axle 240 and the rear axle 250 are examples of a traveling device.

The variable capacity pump 260 is driven by a driving force transmitted from the engine 210. For example, discharge capacity of the variable capacity pump 260 is changed by controlling a tilt angle of a swash plate provided inside the variable capacity pump 260. Hydraulic oil discharged from the variable capacity pump 260 is supplied to the steering cylinder 113, the lift cylinder 124, and the bucket cylinder 125 via a control valve 261. In addition, the hydraulic oil discharged from the variable capacity pump 260 is discharged via a brake valve 265 and a relief valve 266.

The control valve 261 controls a flow rate of the hydraulic oil discharged from the variable capacity pump 260, and distributes the hydraulic oil to the steering cylinder 113, the lift cylinder 124, and the bucket cylinder 125. The brake valve 265 controls the flow rate of the hydraulic oil to be supplied to the relief valve 266. The relief valve 266 releases the pressure when the pressure of the hydraulic oil exceeds a predetermined relief pressure, and discharges the hydraulic oil.

The variable capacity pump 260 is provided with a first pump pressure gauge 262 and a pump capacity meter 263. The first pump pressure gauge 262 measures a discharge pressure of the hydraulic oil discharged from the variable capacity pump 260. The pump capacity meter 263 measures capacity of the variable capacity pump 260 based on a swash plate angle of the variable capacity pump 260.

The lift cylinder 124 is provided with a cylinder pressure gauge 264. The cylinder pressure gauge 264 measures the pressure of the lift cylinder 124.

The variable capacity pump 260 is an example of a device to which the power is distributed from the PTO 220. In another embodiment, the variable capacity pump 260 may be configured to include a plurality of pumps, or may include other destinations such as hydraulically driven fans (not shown), instead of or in addition to the variable capacity pump 260.

The fixed capacity pump 270 is driven by a driving force transmitted from the engine 210. The hydraulic oil discharged from the fixed capacity pump 270 is supplied to a clutch (not shown) inside the transmission 230. The fixed capacity pump 270 is provided with a second pump pressure gauge 271. The second pump pressure gauge 271 measures the discharge pressure of the hydraulic oil discharged from the fixed capacity pump 270. The fixed capacity pump 270 is an example of a device to which the power is distributed from the PTO 220. The fixed capacity pump 270 may be configured to include a plurality of pumps, or may have a supply destination such as a lubrication circuit (not shown).

(Control Device)

The work vehicle 100 includes a control device 300 for controlling the work vehicle 100.

The control device 300 outputs a control signal to the fuel injection device 211, the transmission 230, the variable capacity pump 260, the control valve 261 and the brake valve 265 in response to an operation amount of each operation device (accelerator pedal 152, brake pedal 153, steering wheel 154, front/rear selection switch 155, shift switch 156, boom lever 157, and bucket lever 158) inside the operator cab 150.

Figure 4:
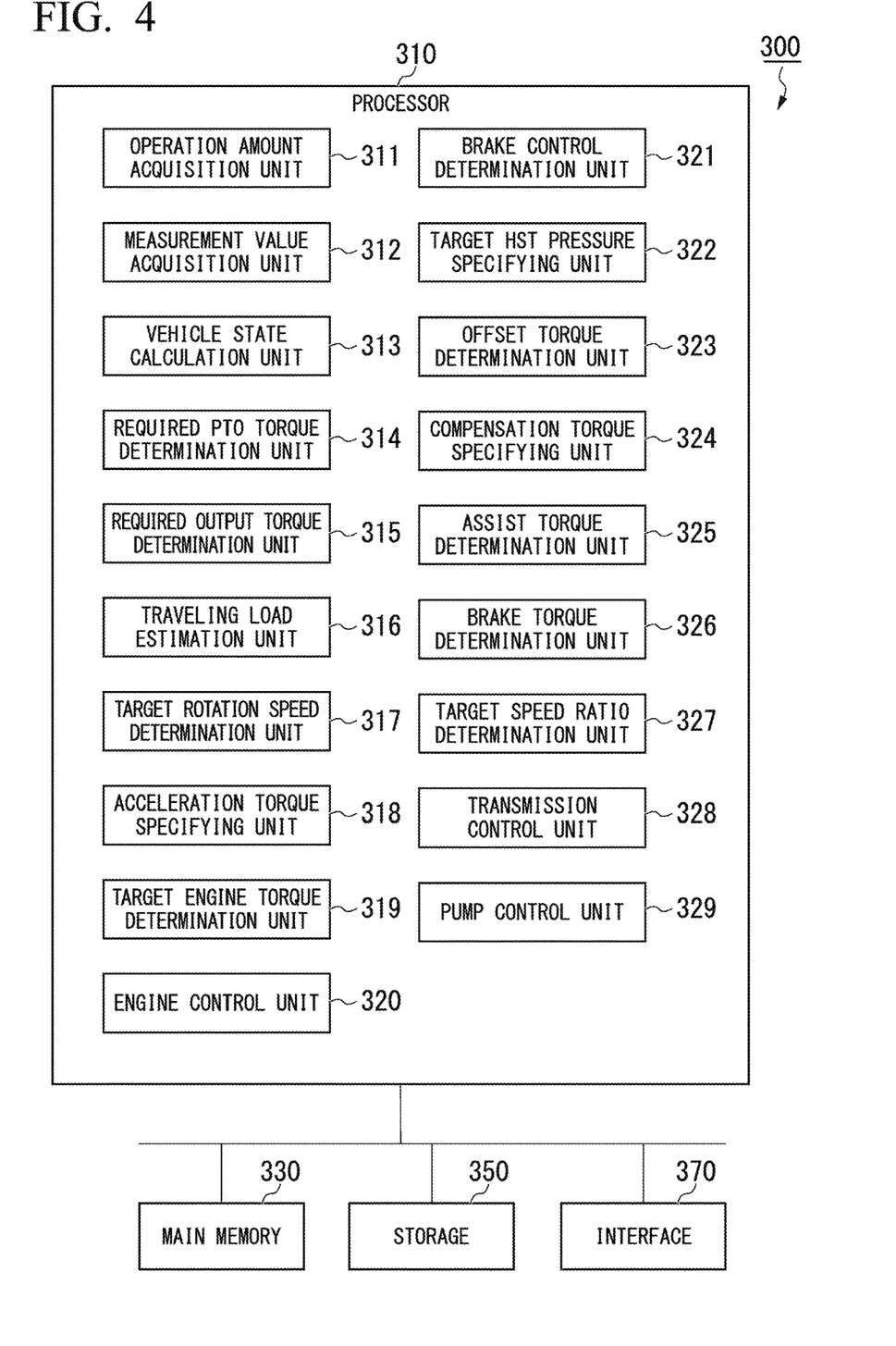
FIG. 4 is a schematic block diagram showing a configuration of a control device of the work vehicle according to the first embodiment.

FIG. 4 is a schematic block diagram showing a configuration of the control device of the work vehicle according to the first embodiment. The control device 300 is a computer including a processor 310, a main memory 330, a storage 350, and an interface 370.

The storage 350 is a non-temporary tangible storage medium. Examples of the storage 350 include a hard disk drive (HDD), a solid state drive (SSD), a magnetic disk, a magneto-optical disc, a compact disc read only memory (CD-ROM), and a digital versatile disc read only memory (DVD-ROM), and a semiconductor memory. The storage 350 may be an internal medium directly connected to a bus of the control device 300, or may be an external medium connected to the control device 300 via the interface 370 or a communication line. The storage 350 stores a program for controlling the work vehicle 100.

The program may partially realize functions of the control device 300. For example, the program may fulfill a function in combination with another program previously stored in the storage or in combination with another program installed in another device. In another embodiment, the computer may include a custom large scale integrated circuit (LSI) such as a programmable logic device (PLD) in addition to the above-described configuration or instead of the above-described configuration. Examples of the PLD include a programmable array logic (PAL), a generic array logic (GAL), a complex programmable logic device (CPLD), and a field programmable gate array (FPGA). In this case, functions realized by the processor may be partially or entirely realized by the integrated circuit.

In a case where the program is distributed to the control device 300 via a communication line, the control device 300 receiving the distribution may deploy the program in the main memory 330, and may execute the above-described process.

In addition, the program may partially realize the above-described function. Furthermore, the program may be a so-called difference file (difference program) that realizes the above-described function in combination with another program previously stored in the storage 350.

In order to execute the program, the processor 310 includes an operation amount acquisition unit 311, a measurement value acquisition unit 312, a vehicle state calculation unit 313, a required PTO torque determination unit 314, a required output torque determination unit 315, a traveling load estimation unit 316, a target rotation speed determination unit 317, an acceleration torque specifying unit 318, a target engine torque determination unit 319, an engine control unit 320, a brake control determination unit 321, a target HST pressure specifying unit 322 (target circuit pressure specifying unit), an offset torque determination unit 323, a compensation torque determination unit 324, an assist torque determination unit 325, a brake torque determination unit 326, a target speed ratio determination unit 327, a transmission control unit 328, and a pump control unit 329.

The operation amount acquisition unit 311 acquires the operation amount from each of the accelerator pedal 152, the brake pedal 153, the steering wheel 154, the front/rear selection switch 155, the shift switch 156, the boom lever 157, and the bucket lever 158. Hereinafter, the operation amount of the accelerator pedal 152 will be referred to as an accelerator operation amount, the operation amount of the brake pedal 153 will be referred to as a brake operation amount, the operation amount of the steering wheel 154 will be referred to as a steering operation amount, a value corresponding to an operation position of the front/rear selection switch 155 will be referred to as an FNR operation amount, a value corresponding to an operation position of the shift switch 156 will be referred to as a shift operation amount, the operation amount of the boom lever 157 will be referred to as a boom operation amount, and the operation amount of the bucket lever 158 will be referred to as a bucket operation amount.

The measurement value acquisition unit 312 acquires measurement values from the fuel injection device 211, the engine tachometer 212, the input shaft tachometer 232, the output shaft tachometer 233, the HST pressure gauge 234, the first pump pressure gauge 262, the pump capacity meter 263, the cylinder pressure gauge 264, and the second pump pressure gauge 271. That is, the measurement value acquisition unit 312 acquires each measurement value of a fuel injection amount of the engine 210, a rotation speed of the engine 210, a rotation speed of the input shaft of the transmission 230, a rotation speed of the output shaft of the transmission 230, a pressure of the HST 231, a pump pressure of the variable capacity pump 260, capacity of the variable capacity pump 260, a pressure of the lift cylinder 124, and a pump pressure of the fixed capacity pump 270.

Based on the measurement values acquired by the measurement value acquisition unit 312, the vehicle state calculation unit 313 calculates an output torque of the engine 210, an upper limit torque of the engine 210, angular acceleration of the engine 210, torques (PTO torques) distributed to the variable capacity pump 260 and the fixed capacity pump 270 by the PTO 220, an input/output speed ratio of the transmission 230, angular acceleration of the output shaft of the transmission 230, and a traveling speed of the work vehicle 100. The output torque of the engine 210 is a torque actually achieved by the engine 210 which is calculated based on the fuel injection amount. The upper limit torque of the engine 210 is a maximum torque which can be achieved by the engine 210.

The required PTO torque determination unit 314 determines a required value (required PTO torque) of the torques distributed from the PTO 220 to the variable capacity pump 260 and the fixed capacity pump 270, based on the steering operation amount, the boom operation amount, and the bucket operation amount which are acquired by the operation amount acquisition unit 311, and the measurement values of the pump pressure of the variable capacity pump 260, the capacity of the variable capacity pump 260, and the pump pressure of the fixed capacity pump 270 which are acquired by the measurement value acquisition unit 312. For example, the required PTO torque determination unit 314 obtains a required flow rate of the variable capacity pump 260 from the steering operation amount, based on a PTO conversion function that defines a relationship between the operation amount and the required flow rate. Further, for example, the required PTO torque determination unit 314 obtains the required flow rate of the variable capacity pump 260 from the boom operation amount and the bucket operation amount based on the PTO conversion function. Then, the required PTO torque determination unit 314 determines the required PTO torque, based on the measurement values of the pump pressure of the variable capacity pump 260, the capacity of the variable capacity pump 260, the pump pressure of the fixed capacity pump 270, and the required flow rate of the specified variable capacity pump 260.

The required output torque determination unit 315 determines the required value (required output torque) of the torque of the output shaft of the transmission 230, based on the accelerator operation amount, the brake operation amount, the shift operation amount, and the FNR operation amount which are acquired by the operation amount acquisition unit 311, and the traveling speed calculated by the vehicle state calculation unit 313. For example, the required output torque determination unit 315 determines the required output torque from the traveling speed calculated by the vehicle state calculation unit 313, based on a traveling conversion function that defines a relationship between the traveling speed and the required output torque. In this case, the required output torque determination unit 315 determines characteristics of the traveling conversion function, based on the accelerator operation amount, the brake operation amount, the shift operation amount, and the FNR operation amount.

Specifically, the required output torque determination unit 315 specifies the traveling conversion function corresponding to a speed range specified by the shift operation amount, out of a plurality of the traveling conversion functions corresponding to a plurality of the speed ranges. When there is an accelerator operation, the required output torque determination unit 315 transforms the specified traveling conversion function, based on a magnification relating to the accelerator operation amount. When there is a brake operation, the required output torque determination unit 315 transforms the specified traveling conversion function, based on the magnification relating to the brake operation amount. The required output torque determination unit 315 determines a code of the required output torque, based on the FNR operation amount. When codes of the required output torque and the traveling speed do not coincide with each other (when the code of a product of the required output torque and the traveling speed is negative), the torque on the braking side is achieved by the transmission 230.

According to the traveling conversion function, when the traveling speed exceeds a predetermined speed, the required output torque has a value on the braking side. Therefore, in the required output torque determination unit 315, when the traveling speed calculated by the vehicle state calculation unit 313 exceeds an upper limit of the speed range specified by the shift operation amount, the accelerator operation amount, and the brake operation amount, the required output torque has a value on the braking side (code opposite to the traveling speed).

The traveling load estimation unit 316 estimates a traveling load torque $T_{load}$ relating to the traveling based on the output torque $T_{eng}$ of the engine 210, angular acceleration $\alpha_{eng}$ of the engine 210, a PTO torque $T_{PTO}$, an input/output speed ratio i of the transmission 230, and angular acceleration $\alpha_{out}$ of the output shaft of the transmission 230 which are calculated by the vehicle state calculation unit 313.

The traveling load torque $T_{load}$ can be calculated based on Equation (1) below.

(Equation 1)

$$T_{load} = \frac{\eta_t}{i} N(T_{eng} - T_{PTO} - I_{eng}\alpha_{eng}) - \frac{I_v}{N}\alpha_{out} \qquad (1)$$

$I_{eng}$ is a moment of inertia of the engine 210. $I_v$ is a moment of inertia of the work vehicle 100. $\eta_t$ is torque efficiency of the transmission 230. N is an axle reduction ratio from the output shaft of the transmission 230 to the front wheel part 130 and the rear wheel part 140. The moment of inertia $I_{eng}$, the moment of inertia $I_v$, the torque efficiency $\eta_t$, and the axle reduction ratio N are constants.

Equation (1) can be derived from Equation (2) showing a relationship between the output torque $T_{eng}$ of the engine 210 and the output torque $T_{out}$ of the transmission 230, and Equation (3) showing a relationship between the output torque $T_{out}$ of the transmission 230, and the acceleration $\alpha_{out}$ of the work vehicle 100. In another embodiment, the traveling load torque $T_{load}$ may be calculated based on an equation other than Equation (1). For example, instead of Equation (2), an equation for specifying the traveling load torque $T_{load}$ may be derived by using an equation showing a relationship among the pressure of the HST 231 which is measured by the HST 231, a capacity command of the variable capacity pump of the HST 231 or the pump capacity measured by the pump capacity meter provided in the variable capacity pump, and the output torque $T_{out}$. In addition, in another embodiment, when the transmission 230 includes an electric motor, an equation for specifying the traveling load torque $T_{load}$ may be derived by using a torque command of the electric motor or an electric motor output torque estimated from a voltage/current.

(Equation 2)

$$T_{out} = \frac{\eta_t}{i}(T_{eng} - T_{PTO} - I_{eng}\alpha_{eng}) \qquad (2)$$

-continued (Equation 3)

$$I_v \frac{1}{N}\alpha_{out} = NT_{out} - T_{load} \quad (3)$$

The target rotation speed determination unit 317 determines a target engine rotation speed used for controlling the engine 210, based on a required engine output which is a sum of required traveling power calculated from the required output torque and the traveling speed, and the required PTO output calculated from the required PTO torque and the measurement value of the rotation speed of the engine 210. The target rotation speed determination unit 317 determines a target engine rotation speed based on a rotation speed conversion function that defines a relationship between the required engine output and the engine rotation speed which are determined in advance by design. For example, the rotation speed conversion function may be designed to suppress the rotation of the engine 210 to the low rotation speed side as much as possible within a range in which the required engine output can be achieved and the engine acceleration is not hindered.

In addition, the target rotation speed determination unit 317 determines the engine rotation speed (required PTO rotation speed) required for realizing the required flow rate of the variable capacity pump 260 which is calculated by the required PTO torque determination unit 314. The target rotation speed determination unit 317 determines the required PTO rotation speed based on a rotation speed conversion function that defines a relationship between the required flow rate of the variable capacity pump 260 and the engine rotation speed which are determined in advance by design. When the target engine rotation speed falls below the required PTO rotation speed, the target rotation speed determination unit 317 determines the target engine rotation speed as the required PTO rotation speed.

The acceleration torque specifying unit 318 calculates a target acceleration torque required for rotating the engine 210 at a target engine rotation speed based on the measurement value of the rotation speed of the engine 210 which is acquired by the measurement value acquisition unit 312 and the target engine rotation speed determined by the target rotation speed determination unit 317. That is, the acceleration torque specifying unit 318 determines target engine acceleration from the rotation speed of a difference between the measurement value of the rotation speed of the engine 210 and the target engine rotation speed, and multiplies the target engine acceleration by the moment of inertia of the engine 210, thereby calculating the target acceleration torque.

The target engine torque determination unit 319 determines a target engine torque which is a torque to be output by the engine 210, based on the PTO torque calculated by the vehicle state calculation unit 313, the upper limit torque of the engine 210, the input/output speed ratio of the transmission 230, the required output torque determined by the required output torque determination unit 315, and the measurement value of the rotation speed of the engine 210. The target engine torque determination unit 319 calculates a required input torque which is a torque of the engine 210 required for obtaining the required output torque by multiplying the required output torque by the input/output speed ratio of the transmission 230. The target engine torque determination unit 319 determines the smaller one of the sum of the PTO torque and the required input torque and the maximum value of the engine torque as the target engine torque.

The engine control unit 320 outputs an engine torque command to the fuel injection device 211. Specifically, the engine control unit 320 outputs the engine torque command indicating the target engine torque determined by the target engine torque determination unit 319. The engine control unit 320 is an example of a drive source control unit.

The brake control determination unit 321 determines whether or not to perform PTO brake control for obtaining a braking force by driving the variable capacity pump 260. Specifically, the brake control determination unit 321 determines to perform the PTO brake control when the required output torque determined by the required output torque determination unit 315 has a value on the braking side.

In another embodiment, the brake control determination unit 321 may determine to perform the PTO brake control when the code of the required output torque on the braking side and an absolute value exceed a certain threshold value.

The target HST pressure specifying unit 322 determines the pressure of the HST 231 corresponding to the required output torque determined by the required output torque determination unit 315 as a target HST pressure (target circuit pressure) which is a control target of the HST 231. A relationship between the output torque of the transmission 230 and the pressure of the HST 231 is determined by a relationship of a gear ratio between the output shaft and the HST motor which are determined by the design of the transmission 230, and the capacity of the HST motor at that time.

The offset torque determination unit 323 determines the offset torque used for the PTO brake control by multiplying the required input torque by a predetermined coefficient. The required input torque is calculated by multiplying the required output torque determined by the required output torque determination unit 315 by the input/output speed ratio of the transmission 230. The offset torque determination unit 323 may determine the offset torque by using the required input torque calculated by the target engine torque determination unit 319. The coefficient used for determining the offset torque is a value greater than −1 and equal to or smaller than 0. The PTO brake control is performed when the required output torque is a negative value. Accordingly, the offset torque is a positive value. The offset torque is a feedforward correction factor for estimating the PTO brake torque that is expected to be required empirically or experimentally.

The compensation torque determination unit 324 determines a compensation torque used for the PTO brake control by performing proportional integral (PI) control based on a difference between an actual HST pressure (actual circuit pressure) which is the measurement value of the pressure of the HST 231 acquired by the measurement value acquisition unit 312 and a target HST pressure specified by the target HST pressure specifying unit. The compensation torque determination unit 324 according to another embodiment may determine the compensation torque by performing other feedback control based on the actual HST pressure and the target HST pressure. The compensation torque is a feedback correction factor for accurately controlling the braking force in accordance with the target.

The assist torque determination unit 325 determines an assist torque for assisting the rotation acceleration of the engine 210, based on the measurement value of the rotation speed of the engine 210 which is acquired by the measurement value acquisition unit 312. For example, the assist torque determination unit 325 performs P control based on a difference between the smaller of the target rotation speed of the engine and an assist guaranteed rotation speed and the measurement value of the rotation speed of the engine 210. In this manner, the assist torque determination unit 325 determines a low rotation assist torque for assisting the rotation acceleration of the engine 210 when the rotation speed of the engine 210 is lower than the assist guaranteed rotation speed. In order to secure the power for the traveling or the work machine, the assist guaranteed rotation speed is set so that the engine rotation speed does not fall below a prescribed rotation speed.

In addition, the assist torque determination unit 325 performs the P control based on a difference between the rotation speed of the engine required for realizing the required flow rate of the variable capacity pump 260 calculated by the required PTO torque determination unit 314 and the measurement value of the rotation speed of the engine 210. In this manner, the assist torque determination unit 325 determines a work machine assist torque for assisting the rotation acceleration of the engine 210 when the hydraulic oil is required for driving the work machine 120. The assist torque determined by the assist torque determination unit 325 is a value equal to or greater than 0. The assist torque is a correction factor for assisting the engine rotation acceleration when it is necessary to quickly increase the engine rotation.

The brake torque determination unit 326 determines the brake torque consumed by the variable capacity pump 260 in the PTO brake control, based on the offset torque, the compensation torque, and the assist torque. Specifically, the brake torque determination unit 326 determines the brake torque by adding the offset torque and the compensation torque and subtracting the assist torque.

The target speed ratio determination unit 327 determines a target input/output speed ratio of the transmission 230 based on the measurement value of the rotation speed of the input shaft of the transmission 230, the measurement value of the rotation speed of the output shaft of the transmission 230, the traveling load torque estimated by the traveling load estimation unit 316, the target output torque determined by the required output torque determination unit 315, and the target engine acceleration specified by the acceleration torque specifying unit 318. Specifically, the target speed ratio determination unit 327 estimates the rotation speed of the output shaft of the transmission 230 after the lapse of time relating to a predetermined control cycle, and sets the rotation speed of the output shaft of the transmission 230 as the target rotation speed, based on the rotation speed of the output shaft of the transmission 230, the traveling load torque, and the target output torque. The target speed ratio determination unit 327 estimates the rotation speed of the input shaft of the transmission 230 after the lapse of time relating to a predetermined control cycle, and sets the rotation speed of the input shaft of the transmission 230 as the target rotation speed of the input shaft, based on the rotation speed of the input shaft of the transmission 230 and the target engine acceleration. The target speed ratio determination unit 327 determines a target input/output speed ratio by dividing the target rotation speed of the output shaft by the target rotation speed of the input shaft.

The transmission control unit 328 outputs a control command of the transmission 230 in order to realize the target input/output speed ratio determined by the target speed ratio determination unit 327. For example, the transmission control unit 328 outputs a capacity command of the HST 231 included in the transmission 230.

The pump control unit 329 outputs a control command of the variable capacity pump 260 in order to realize an absorption torque which is a sum of the required PTO torque determined by the required PTO torque determination unit 314 and the brake torque determined by the brake torque determination unit 326. In addition, when the PTO brake control is performed, the pump control unit 329 outputs a control command of the brake valve 265 in order to realize the brake torque.

(Control Method for Work Vehicle)

Figure 5:
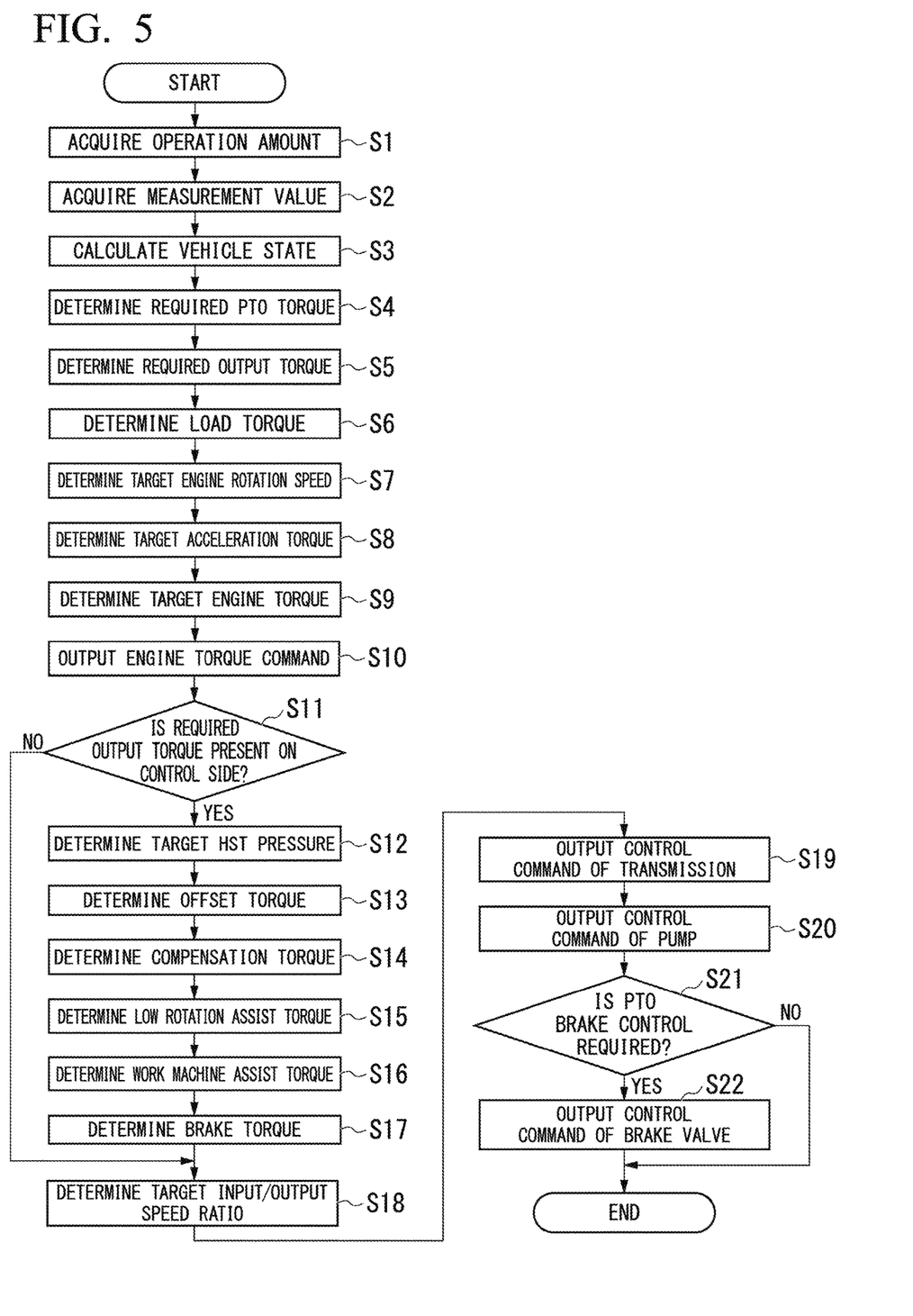
FIG. 5 is a flowchart showing a control method for the work vehicle according to the first embodiment.

FIG. 5 is a flowchart showing a control method for the work vehicle according to the first embodiment.

First, the operation amount acquisition unit 311 acquires the operation amount from each of the accelerator pedal 152, the brake pedal 153, the steering wheel 154, the front/rear selection switch 155, the shift switch 156, the boom lever 157, and the bucket lever 158 (Step S1). In addition, the measurement value acquisition unit 312 acquires the measurement values from the fuel injection device 211, the engine tachometer 212, the input shaft tachometer 232, the output shaft tachometer 233, the HST pressure gauge 234, the first pump pressure gauge 262, the pump capacity meter 263, the cylinder pressure gauge 264, and the second pump pressure gauge 271 (Step S2).

Next, based on the measurement values acquired in Step S2, the vehicle state calculation unit 313 calculates the output torque of the engine 210, the upper limit torque of the engine 210, the angular acceleration of the engine 210, the PTO torque, the input/output speed ratio of the transmission 230, the angular acceleration of the output shaft of the transmission 230, and the traveling speed of the work vehicle 100 (Step S3).

The required PTO torque determination unit 314 determines the required PTO torque based on the measurement values of the steering operation amount, the boom operation amount, and the bucket operation amount which are acquired in Step S1, the pump pressure and the capacity of the variable capacity pump 260 which are acquired in Step S2, and the pump pressure of the fixed capacity pump 270 (Step S4). The required output torque determination unit 315 determines the required output torque based on the operation amount relating to the traveling acquired in Step S1 and the traveling speed calculated in Step S3 (Step S5). The traveling load estimation unit 316 estimates the traveling load torque based on the value of the vehicle state calculated in Step S3 (Step S6).

The target rotation speed determination unit 317 determines the target engine rotation speed based on the required engine output which is a sum of the required traveling power calculated from the required output torque and the traveling speed, and the required PTO output calculated from the required PTO torque and the measurement value of the rotation speed of the engine 210 (Step S7). The acceleration torque specifying unit 318 calculates the target acceleration torque based on the measurement value of the rotation speed of the engine 210 and the target engine rotation speed determined in Step S7 (Step S8). The target engine torque determination unit 319 determines the target engine torque based on the measurement values of the required output torque, the PTO torque calculated in Step S3, the upper limit torque of the engine, the input/output speed ratio of the transmission 230, and the rotation speed of the engine 210 acquired in Step S2 (Step S9). The engine control unit 320 outputs an engine torque command indicating the target engine torque determined in Step S9 (Step S10).

Next, the brake control determination unit 321 determines whether or not the required output torque determined in Step S5 has a value on the braking side (Step S11). When the required output torque has a value on the drive side (Step S11: NO), the brake control determination unit 321 determines that it is not necessary to perform the PTO brake control.

When the required output torque has a value on the braking side (Step S11: YES), the brake control determination unit 321 determines that it is necessary to perform the PTO brake control. When the required output torque has a value on the braking side (Step S11: YES), the target HST pressure specifying unit 322 determines the target HST pressure which is the control target of the HST 231, based on the required output torque determined in Step S5 (Step S12). The offset torque determination unit 323 determines the offset torque by multiplying the required input torque by a predetermined coefficient (Step S13).

The compensation torque determination unit 324 determines the compensation torque by performing the PI control based on a difference between the actual HST pressure which is the measurement value of the pressure of the HST 231 acquired by the measurement value acquisition unit 312, and the target HST pressure specified by the target HST pressure specifying unit (Step S14). When the actual HST pressure is lower than the target HST pressure, the compensation torque has a positive value. When the actual HST pressure is higher than the target HST pressure, the compensation torque has a negative value.

The assist torque determination unit 325 determines the low rotation assist torque by performing the P control based on a difference between the smaller of the target rotation speed of the engine and the assist guaranteed rotation speed and the measurement value of the rotation speed of the engine 210 (Step S15). In addition, the assist torque determination unit 325 determines the work machine assist torque by performing the P control based on a difference between the rotation speed of the engine required for an operator to quickly realize the work machine speed, and the measurement value of the rotation speed of the engine 210 (Step S16).

The brake torque determination unit 326 determines the brake torque by subtracting the low rotation assist torque and the work machine assist torque from the torque value obtained by adding the offset torque and the compensation torque (Step S17).

The target speed ratio determination unit 327 determines the target input/output speed ratio based on the measurement value of the rotation speed of the input shaft of the transmission 230, the measurement value of the rotation speed of the output shaft of the transmission 230, the load torque, the target output torque, and the target engine acceleration (Step S18). The transmission control unit 328 outputs a control command of the transmission 230 for achieving the target input/output speed ratio (Step S19).

The pump control unit 329 specifies the capacity of the variable capacity pump 260 required for realizing the absorption torque which is a sum of the required PTO torque determined in Step S4 and the brake torque determined in Step S17, and outputs a control command indicating the capacity to the variable capacity pump 260 (Step S20).

In addition, the pump control unit 329 determines whether or not to perform the PTO brake control based on a determination result in Step S11 (Step S21). In Step S11, the brake control determination unit 321 determines to perform the PTO brake control when the required output torque has a value on the braking side.

When the PTO brake control is performed (Step S21: YES), the pump control unit 329 outputs a control command instructing the brake valve 265 to open in accordance with the brake torque (Step S22). In this manner, the hydraulic oil is discharged from the relief valve 266 when the work vehicle 100 is braked. Therefore, out of the torques distributed from the PTO 220 to the variable capacity pump 260, the torque which is not used for controlling the work machine 120 and controlling the steering is consumed as heat.

The control device 300 performs the above-described control processes at every predetermined control cycle.

(Operational Effect)

As described above, according to the control device 300 of the first embodiment, the brake torque which is the torque consumed by the variable capacity pump 260 is determined based on the target HST pressure and the actual HST pressure of the HST 231, and the variable capacity pump 260 is controlled based on the brake torque. In this manner, the control device 300 feeds back the torque of the output shaft of the transmission 230 by the HST pressure. Accordingly, the control device 300 can accurately control the braking force of the work vehicle 100 even when the power system of the work vehicle 100 does not include the electrical hardware.

In addition, according to the control device 300 of the first embodiment, the required output torque is specified based on the operation amount of the operation device and the traveling speed of the work vehicle 100, and the target HST pressure is determined based on the required output torque. In this manner, the control device 300 enables the work vehicle 100 to achieve the braking force in accordance with the operation amount of the operator.

In addition, according to the control device 300 of the first embodiment, the brake torque is determined based on the sum of the offset torque obtained by multiplying the required output torque by the speed ratio and the predetermined coefficient, and the compensation torque obtained by performing the feedback control based on the difference between the target HST pressure and the actual HST pressure. The control device 300 can improve followability of the braking immediately after the braking starts by using the offset torque, or can achieve both high responsiveness and stability of the braking force. Therefore, the control device 300 can improve accuracy in a final braking force by using the compensation torque. Furthermore, the control device 300 according to the first embodiment determines the assist torque based on the rotation speed of the drive source, and determines the brake torque by subtracting the assist torque from the sum of the offset torque and the compensation torque. In this manner, the control device 300 can further use a portion of the braking force to assist the rotation acceleration of the engine 210.

In another embodiment, the control device 300 may determine the brake torque without using at least any one of the offset torque and the assist torque.

The embodiment has been described above in detail with reference to the drawings. However, the specific configuration is not limited to the above-described embodiment, and various design changes can be made.

In addition, the work vehicle 100 according to the first embodiment is the wheel loader. However, the configuration is not limited thereto. For example, the work vehicle 100 according to another embodiment may be another work vehicle 100 such as a bulldozer or a tractor. In addition, in another embodiment, the control device 300 may be applied to a power machine other than a work vehicle.

According to at least one of the above-described aspects, the control device can accurately control a braking force of a power device regardless of whether or not the power device includes electrical hardware.

The invention claimed is:

1. A control device for a power machine including
a drive source,
a hydraulic pump driven by a driving force of the drive source,
a power take off device configured to transmit a portion of the driving force of the drive source to the hydraulic pump,
a power transmission device including a hydrostatic continuously variable transmission, an input shaft connected to the power take off device, and an output shaft connected to a load, and transmitting the driving force input to the input shaft to the output shaft, and
an operation device that provides an instruction regarding a magnitude of the driving force of the drive source,
the control device comprising:
a target circuit pressure specifying unit configured to specify a target circuit pressure of the hydrostatic continuously variable transmission;
a measurement value acquisition unit configured to acquire an actual circuit pressure of the hydrostatic continuously variable transmission;
a brake torque determination unit configured to determine a brake torque based on the target circuit pressure and the actual circuit pressure, the brake torque being a torque consumed by the hydraulic pump; and
a pump control unit configured to control the hydraulic pump based on the brake torque.

2. The control device for a power machine according to claim 1, further comprising:
a required output torque determination unit configured to determine a required output torque of the power transmission device based on an operation amount of the operation device and a rotation speed of the output shaft,
the target circuit pressure specifying unit being configured to specify the target circuit pressure based on the required output torque.

3. The control device for a power machine according to claim 2, further comprising:
an offset torque determination unit configured to determine an offset torque obtained by multiplying the required output torque of the power transmission device by a predetermined coefficient; and
a compensation torque determination unit configured to determine a compensation torque by feedback control based on a difference between the target circuit pressure and the actual circuit pressure,
the brake torque determination unit being configured to determine the brake torque based on a sum of the offset torque and the compensation torque.

4. The control device for a power machine according to claim 3, further comprising:

an assist torque determination unit configured to determine an assist torque based on a rotation speed of the drive source, the assist torque being usable to assist rotation acceleration of the drive source,
the brake torque determination unit being configured to determine the brake torque by subtracting the assist torque from the sum of the offset torque and the compensation torque.

5. A work vehicle including the control device according to claim 1, the work vehicle further comprising:
the drive source;
a traveling device driven by the driving force of the drive source;
the hydraulic pump driven by the driving force of the drive source;
the power take off device configured to transmit the portion of the driving force of the drive source to the hydraulic pump;
the power transmission device including the hydrostatic continuously variable transmission, the input shaft connected to the power take off device, and the output shaft connected to the traveling device, and transmitting the driving force input to the input shaft to the output shaft; and
the operation device for providing the instruction regarding the magnitude of the driving force of the drive source.

6. A control method for a power machine including
a drive source,
a traveling device driven by a driving force of the drive source,
a hydraulic pump driven by the driving force of the drive source,
a power take off device configured to transmit a portion of the driving force of the drive source to the hydraulic pump,
a power transmission device including a hydrostatic continuously variable transmission, an input shaft connected to the power take off device, and an output shaft connected to the traveling device, and transmitting the driving force input to the input shaft to the output shaft, and
an operation device for providing an instruction regarding a magnitude of the driving force of the drive source,
the control method comprising:
specifying a target circuit pressure of the hydrostatic continuously variable transmission;
acquiring an actual circuit pressure of the hydrostatic continuously variable transmission;
determining a brake torque based on the target circuit pressure and the actual circuit pressure, the brake torque being a torque consumed by the hydraulic pump; and
controlling the hydraulic pump based on the brake torque.

* * * * *